US011105933B2

(12) United States Patent
Skupin et al.

(10) Patent No.: US 11,105,933 B2
(45) Date of Patent: Aug. 31, 2021

(54) METHOD FOR DETERMINING A DATA PROFILE FOR THE SATELLITE-BASED DETERMINATION OF A POSITION OF A VEHICLE

(71) Applicant: Robert Bosch GmbH, Stuttgart (DE)

(72) Inventors: Christian Skupin, Garbsen (DE); Philip Wette, Bueckeburg (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 16/280,537

(22) Filed: Feb. 20, 2019

(65) Prior Publication Data

US 2019/0265365 A1 Aug. 29, 2019

(30) Foreign Application Priority Data

Feb. 28, 2018 (DE) ...................... 10 2018 202 983.0

(51) Int. Cl.
*G01S 19/22* (2010.01)
*G01S 19/49* (2010.01)
*G01S 19/40* (2010.01)

(52) U.S. Cl.
CPC .............. *G01S 19/22* (2013.01); *G01S 19/40* (2013.01); *G01S 19/49* (2013.01)

(58) Field of Classification Search
CPC .......... G01S 19/22; G01S 19/42; G01S 19/40; G01S 19/49; G01S 19/48; G01S 19/09; G01S 19/05
USPC ...................................................... 342/357.23
See application file for complete search history.

(56) References Cited

U.S. PATENT DOCUMENTS

2015/0127249 A1* 5/2015 Strau ..................... G08G 1/0112
701/439
2019/0103023 A1* 4/2019 McNew ............... G08G 1/0962

* cited by examiner

*Primary Examiner* — Harry K Liu
(74) *Attorney, Agent, or Firm* — Maginot, Moore & Beck LLP

(57) ABSTRACT

A method for determining an environment-specific data profile for a satellite-based determination of a position of a vehicle includes ascertaining the position of the vehicle and receiving satellite data. The environment-specific data profile is determined using the ascertained position of the vehicle, a satellite position of a satellite from the received satellite data, and a path length of a satellite signal between the satellite position and the vehicle position determined from the satellite data.

15 Claims, 2 Drawing Sheets

METHOD FOR DETERMINING A DATA PROFILE FOR THE SATELLITE-BASED DETERMINATION OF A POSITION OF A VEHICLE

This application claims priority under 35 U.S.C. § 119 to patent application no. DE 102018202983.0 filed on Feb. 28, 2018 in Germany, the disclosure of which is incorporated herein by reference in its entirety.

The disclosure relates to a method for determining a data profile for the satellite-based determination of a position of a vehicle. The disclosure can be used, in particular, in autonomous driving.

BACKGROUND

An autonomous vehicle is a vehicle which manages without a driver. In this case, the vehicle drives autonomously by independently detecting, for example, the course of the road, other road users or obstacles and calculating the corresponding control commands in the vehicle, which are needed to react to this course of the road or the other road users and their behavior or the detected obstacles, as well as forwarding corresponding commands for initiating these reactions to the actuators in the vehicle, as a result of which the driving profile of the vehicle is correctly or suitably influenced. The driver is not involved in the driving process in a fully autonomous vehicle.

For an autonomous mode, a vehicle requires, inter alia, a sensor system which is able to determine a highly accurate vehicle position, in particular with the aid of navigation satellite data (GPS, GLONASS, Beidou, Galileo, etc.). In this case, the sensor system can concomitantly use correction data from correction data services to calculate the position of the vehicle in an even more accurate manner. Correction data services which can determine the error effect in orbit (substantially satellite orbit errors, satellite clock errors, code and phase errors and ionospheric and tropospheric refraction effects) are known. With the aid of such existing correction data services, it is possible to take into account said error effects in the satellite-based or GNSS-based (Global Navigation Satellite System) localization, with the result that the accuracy of the satellite-based localization result increases. Such correction services usually provide position-based correction parameters, on the basis of which the GNSS data or the ascertained position can be corrected.

The existing correction data services make it possible to increase the accuracy of the GNSS-based localization in the cm range as long as there is line of sight to the satellites used. In the case of shadowing, for example by tall buildings, although the accuracy is still generally increased by using correction data services in comparison with a failure to use correction data, the localization accuracy deteriorates in this case (for example to an accuracy of the order of magnitude of 1 meter or 10 meters). The problem is, in particular, the fact that a GNSS receiver does not completely capture the error which arises even when using correction data in the case just described, with the result that, although a larger error ellipse is assumed, for example, it does not have a correct center of the ellipse. In this case, the term "error ellipse" describes a region around a possible actual position which is intended to be located. An ellipse is suitable for precisely defining such a region with few parameters.

Such a reduction (degradation) in the localization reliability by means of GNSS-based systems caused by shadowing violates, for example, the accuracy and integrity requirements imposed on a GNSS-based localization system for use in highly automated or autonomous driving. The above-described degradation of the GNSS-based localization in urban areas arises not only from shadowing but also from signal reflections of the GNSS signals at objects. This is often the case, in particular, in urban areas as a result of a multiplicity of tall buildings, for example when driving through a street canyon. Extending the signal paths between GNSS satellites and GNSS receivers in the event of interaction with objects (for example reflection or scattering) produces a systematic error which is currently not taken into account in commercial systems and also cannot be taken into account with the methods currently used. Countermeasures from the scientific environment are known and are intended to increase the accuracy of the GNSS-based localization using a 3-D model of the environment (3-D building map).

SUMMARY

In this case, the disclosure proposes a method for determining a data profile for the satellite-based determination of a position of a vehicle, having the following steps of:
a) ascertaining a vehicle position,
b) receiving satellite data,
c) determining an environment-specific data profile using the vehicle position ascertained in step a), a satellite position of a satellite, the satellite data from which were received in step b), and a path length of a satellite signal between the satellite position and the vehicle position, as determined from the satellite data.

The method is suitable, in particular, for increasing the accuracy during satellite-based position determination (localization) in autonomous vehicles, in particular if the latter operate in urban areas, for instance in street canyons. However, the method can also be used in any other application in a vehicle (for example for a navigation system) or for any desired other driver assistance system.

The solution approach described here has the particular advantage that it can manage without a 3-D building map. Rather, it is possible to provide a data profile which assigns a data value or a data set, for instance a signal and/or path length error, to a particular vehicle position in combination with a particular satellite position. In other words, the data profile can provide signal and/or path length errors, which can be expected at the current vehicle position, on the basis of the satellite position. As a result, the computing effort needed to carry out the method described is also considerably lower, in particular, than in methods which attempt to understand and predict reflections which actually occur on the basis of a 3-D building map.

The vehicle for which the method described here is used may be an automobile. The vehicle is preferably an autonomous vehicle. However, the method can also be carried out in and with any other vehicle.

GNSS stands for global navigation satellite system. GNSS is a system for position determination and/or navigation on earth and/or in the air by receiving the signals from navigation satellites, referred to as satellite data here.

In this case, GNSS is a collective term for the use of existing and future global satellite systems such as GPS (NAVSTRAR GPS), GLONASS, Beidou and Galileo. A GNSS sensor is therefore a sensor system which is suitable for receiving and processing, for instance evaluating, navigation satellite data. The GNSS sensor is preferably able to determine a highly accurate vehicle position with the aid of navigation satellite data (GPS, GLONASS, Beidou, Galileo).

A vehicle position is first of all ascertained in step a). In this case, it is not necessary, in particular, to resort to navigation satellite data. In other words, the position determination according to step a) can be carried out without resorting to or receiving navigation satellite data. The vehicle position is preferably not determined in step a) in a satellite-based manner or with a localization sensor system which is redundant with respect to the GNSS sensor system. For example, the vehicle position can be ascertained in step a) on the basis of a preceding (valid) or last known position by means of inertial navigation methods, in particular inertial navigation. However, the position can also go back to an original (corrected) position determined from satellite data and may have been extrapolated on the basis of such a position by means of inertial navigation.

In step b), (GNSS) satellite data are received, in particular at the vehicle position ascertained in step a). In this case, satellite data which can or have been usable to determine the position are regularly received from (GNSS) satellites. The satellite data are, in particular, navigation satellite data, that is to say those satellite data which are suitable for navigation and/or position determination. For this purpose, the satellite data can be received and (initially) processed, if appropriate, by a GNSS receiver. The satellite data can then be forwarded to a GNSS sensor which processes or evaluates said data for the purpose of decoding and/or position determination. Structural units in which a corresponding receiver and a sensor are combined can also be used and are concomitantly included here.

An environment-specific data profile is determined or created in step c). This is carried out using the vehicle position ascertained in step a), a satellite position of a satellite, the satellite data from which were received in step b), and a path length of a satellite signal between the satellite position and the vehicle position, as determined from the satellite data. In this case, the data profile can be determined or created in such a manner that a path length determined from the satellite data and/or a path length error determined from the satellite data (or the path length) and the vehicle position ascertained in step a) is/are assigned to the pair of values comprising the vehicle position and the satellite position.

In this case, the satellite position usually relates to the position of the satellite, which emitted the corresponding satellite data, at the emission time. In order to increase the accuracy, the vehicle position can be supplemented or replaced with a receiver position of a GNSS receiver which is at or in the vehicle and is or was used to receive the satellite data. The data profile is environment-specific since its data, for example path length errors at a vehicle position, are influenced by or are dependent on the environment around the vehicle position(s).

One advantageous configuration proposes that the vehicle position is ascertained in step a) using a vehicle environment sensor system and/or inertial navigation. The environment sensor system may comprise an optical, magnetic, LIDAR and/or RADAR sensor. Known inertial measuring units (IMU) can be used for the inertial navigation.

One advantageous configuration proposes that the data profile provides data for the satellite-based determination of a position of a vehicle on the basis of a vehicle position and a satellite position. The data profile advantageously comprises a multiplicity of correction data items for the satellite-based navigation and/or localization. In this case, it is preferred for the correction data to be stored in the data profile on the basis of the vehicle position and the satellite position. The correction data may be path length correction values ascertained on the basis of the determined path length errors. In this case, it is possible to take into account distribution statistics of the path length error, which show the frequency of an error, in particular at a particular (vehicle) position. The data profile is preferably such that a data value or a data set, for instance a signal and/or path length error, is assigned to a particular vehicle position in combination with a particular satellite position. In other words, the data profile advantageously contains signal and/or path length errors which can be expected at the current vehicle position on the basis of the or a particular satellite position.

The satellite position can be ascertained or can be supplemented or replaced with ephemeris data. The vehicle position can be supplemented or replaced with a receiver position of a GNSS receiver arranged in or on the vehicle. The data profile can then provide data, in particular path length errors or path length correction values, for the satellite-based determination of a position of a vehicle on the basis of a receiver position and ephemeris data.

One advantageous configuration proposes that the data profile comprises (at least) a path length error profile. Such a data profile or path length error profile can be created, for example, by ascertaining an (actual) path length (so-called pseudo-range) from the satellite data received in step b), which is compared with the distance between the vehicle position ascertained in step a) and the satellite position. A difference between this distance and the associated (actual) path length can be stored in the data profile as a path length error, in particular by assigning the latter to the vehicle position and to the satellite position.

One advantageous configuration proposes that a desired path length is determined using the vehicle position ascertained in step a) and the satellite position. The desired path length is generally the (shortest) distance between the vehicle position ascertained in step a) and the satellite position. In this case, it is particularly advantageous if the desired path length is compared with an actual path length (pseudo-range) determined from the satellite data received in step b) in order to ascertain a path length error.

Another advantageous configuration proposes that the environment-specific data profile comprises (at least) a path length profile. As an alternative or in addition to the determined path length errors, the determined actual path lengths can be stored on the basis of the vehicle position and the satellite position for this purpose. This advantageously makes it possible to also learn GNSS path length profiles in addition to or instead of the GNSS path length error profiles. Said GNSS path length profiles can be advantageously used for localization, for example, by means of a so-called fingerprint method.

One advantageous configuration proposes that the data profile is managed by a superordinate system and is made available to a multiplicity of GNSS sensors. The superordinate system may be GNSS management and/or a so-called cloud.

The superordinate system (in the form of a so-called backend system) preferably uses information from a multiplicity of vehicles (so-called crowdsourcing) to create the data profile. As a result, the GNSS path length measurement errors of a multiplicity of vehicles can be advantageously taken into account, thus making it possible to achieve a higher statistical certainty when determining GNSS path length error profiles. The crowdsourcing approach also makes it possible to achieve the situation in which the determined GNSS path length error profiles can also be made available to a vehicle which has never driven through the relevant location. The provision of the data profile or the GNSS path length error profiles via a so-called cloud service is therefore considered to be advantageous here. In other words, the solution described here advantageously makes it possible to collect correction data from historical pseudo-range and reference location measurements or correction measurements by means of the crowdsourcing approach.

If the data profile or the GNSS path length error profiles is/are available as a cloud service, these can be used as correction data for the GNSS-based localization, for example for the purpose of correcting the measured GNSS path lengths in urban areas. These correction data may be required for vehicles having a redundant localization sensor system (in particular required in autonomous vehicles), for example if the environment-based localization (RADAR, LIDAR, video, etc.) currently can be used only inadequately, for example on account of concealment or contamination. However, other vehicles which are able to process the statistical GNSS measurement errors or path length error profiles can also benefit from such a correction data service.

The correction data may have a statistical distribution or probability density function, in particular on the basis of at least the vehicle position and satellite position. It can also be taken into account that the correction data are dependent on the vehicle position and an antenna or receiver height.

It is particularly advantageous to cluster the pseudo-range correction data dependences (vehicle or receiver position and satellite position), with the result that identical correction data can be combined to form a correction data item and/or a correction data set over a relatively large dependence range. This can increase the efficiency of the method, in particular the provision of the correction data, since they are now valid over a relatively large dependence range.

For clustering, it is possible to proceed, for example, in such a manner that the determined correction data, for instance path length errors, are first of all scanned, in particular by means of the superordinate system (backend). In this case, vehicle position cells of 1 m [meter] times 1 m and a resolution of the satellite position of one degree can be stipulated or used, for example. In addition, adjacent vehicle position cells can be compared with respect to the statistics of the path length errors or GNSS path length error profiles. In the event of identical statistics (for example if the expected value and the variance are less than 10 cm [centimeters] or even less than 5 cm [centimeters]), the cells are preferably merged and the statistics are "combined".

Older, historical data obtained from steps a) and b) are preferably also used in step c). This means, in particular, that, in order to determine a data profile valid for a particular time or after a particular time, vehicle positions and satellite data ascertained in a preceding period are possibly used.

In order to also cope with changes in the quasi-static environment, old measurement data before a particular time are possibly rejected when determining the environment-specific data profile in step c) if it is found that a data profile with a significant deviation (for example an average value over 100 measurements deviates by more than 30%) from the old data profile can be determined after this time. Measurement data can also be only partially rejected. This can be effected, for example, by including older measured values with less weight than newer measured values in the ascertainment of the data profile in step c). A special exemplary embodiment involves weighting the measurement data from steps a) and b) in a manner inversely proportional to the age of the measurement data in days.

The intention is also to describe here a computer program for carrying out a method described here. In other words, this relates, in particular, to a computer program (product) comprising instructions which, when the program is executed by a computer, cause the latter to carry out a method described here.

Furthermore, the intention is also to describe a machine-readable storage medium which stores the computer program. The machine-readable storage medium is usually a computer-readable data storage medium.

The intention is also to describe here a position sensor which is set up to carry out a method described here. For example, the above-described storage medium may be part of the position sensor or may be connected to the latter. The position sensor is preferably arranged in or on the vehicle and is intended and set up to be mounted in or on such a vehicle. The position sensor is preferably a GNSS sensor. The position sensor is also preferably intended and set up for an autonomous mode of the vehicle. The position sensor may also be a combined motion and position sensor. Such a sensor is particularly advantageous for autonomous vehicles. The position sensor or a computing unit (processor) of the position sensor can access the computer program described here, for example, in order to carry out a method described here.

The details, features and advantages configurations discussed in connection with the method can accordingly also arise in the position sensor presented here, the computer program and/or the storage medium and vice versa. In this respect, reference is made in full to the statements made there for characterization of the features in greater detail.

BRIEF DESCRIPTION OF THE DRAWINGS

The solution presented here and its technical environment are explained in more detail below on the basis of the figures. It should be pointed out that the disclosure is not intended to be restricted by the exemplary embodiments shown. In particular, it is also possible, if not explicitly illustrated otherwise, to extract partial aspects of the substantive matter explained in the figures and to combine them with other parts and/or findings from other figures and/or the present description. In the drawings.

DETAILED DESCRIPTION

Figure 1:
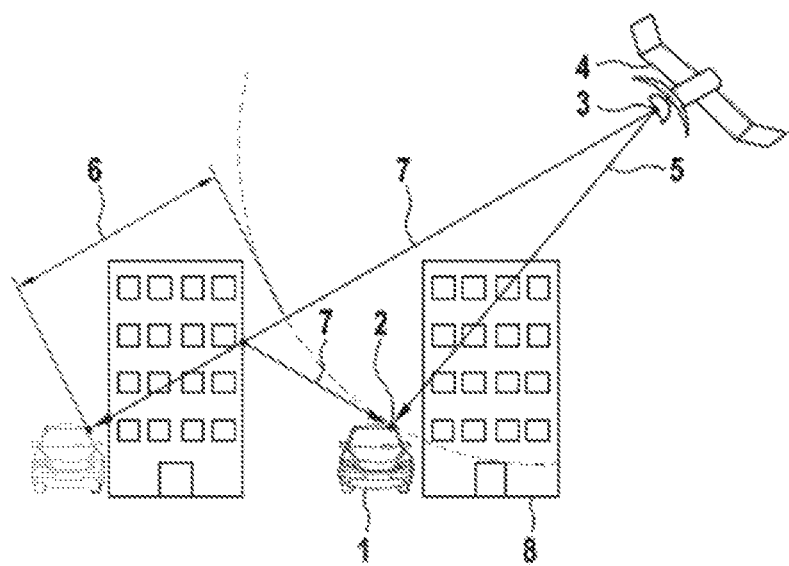
FIG. 1: schematically shows a vehicle in an urban environment in which a method described here is used.

FIG. 1 schematically shows a vehicle 1 in an urban environment in which a method described here is used. The urban environment is indicated here, by way of example, by two buildings 8. It can be seen that the right-hand building 8 causes shadowing with respect to the vehicle 1. As a result, it is not possible to directly transmit signals from the satellite 4 to the vehicle 1; rather, the satellite signal reaches the vehicle 1 only after reflection on the right-hand side of the left-hand building 8.

This results in a path length error 6 which is illustrated in FIG. 1. This is because a GNSS sensor (not illustrated here) arranged, by way of example, on the vehicle 1 captures overall an actual path length 7 (comprising a part before the reflection and a part after the reflection) of the satellite signal on the basis of the conventional propagation time measurement, which actual path length is referred to as a "pseudo-range" and is longer than the actual distance between the vehicle position 2 and the satellite position 3. This actual distance between the vehicle position 2 and the satellite position 3 is also referred to as the desired path length 5 here.

If the (uncorrected) actual path length 7 were used in the position determination, the result would be a position deviation, as illustrated on the left-hand side of FIG. 1. In order to avoid this, it is necessary to correct the path length error 6, to which the solution proposed here can contribute by determining an environment-specific data profile, as described below.

A vehicle position 2, which coincides here, by way of example and for a simplified illustration, with the position of a GNSS receiver not illustrated in any more detail, is first of all ascertained. The vehicle position 2 is ascertained here, by way of example, using an environment sensor (not illustrated) which is arranged on the vehicle and can measure a vehicle position 2 which is as exact as possible on the basis of the known position of the buildings 8. Since the vehicle 1 has both the possibility for satellite navigation and an environment sensor (not illustrated), this is a vehicle having a redundant localization system.

In the solution presented here, corresponding vehicles can be used as a reference station for measuring current GNSS pseudo-ranges and the reference location and for measuring pseudo-range correction data (in each case dependent on the location of the receiver antenna or vehicle position and the satellite position).

Furthermore, according to the illustration in FIG. 1, satellite data are received at the vehicle position 2, for example by means of the GNSS receiver which is not illustrated in any more detail here. An actual path length 7 (so-called pseudo-range) is also determined here in a conventional manner from the received satellite data.

An environment-specific data profile is then determined using the ascertained vehicle position 2, the satellite position 3 and a path length determined from the satellite data, here the previously determined actual path length 7 (pseudo-range).

The data profile comprises here, by way of example, a path length error profile. A desired/actual comparison is carried out here, by way of example, in order to ascertain the path length error 6. For this purpose, the actual path length 7 is compared with a desired path length 5 which was determined using the vehicle position 2 and the satellite position 3. The path length error 6 can now be stored in the data profile on the basis of the vehicle position 2 (or the receiver position) and the satellite position 3 and can be made available to other vehicles as a correction value.

The dependence of the correction data on the location of the receiver antenna (vehicle position) and the satellite position has the advantage that these correction data are valid for all satellites which will receive from a particular compass direction from a particular position of the receiving antenna and are at the satellite position. The dependence on an individual satellite can therefore be dispensed with.

The configuration of the solution presented here, as discussed in connection with FIG. 1, can also be described in other words such that, in good situations (that is to say the vehicle position of the vehicle being located is robust even without GNSS support, for example as a result of redundant localization by means of an environment sensor system such as video, RADAR and/or LIDAR), the measured GNSS signal path lengths (the path lengths of GNSS signals between the satellite and the receiver are also referred to as pseudo-ranges in the technical jargon) are measured and are compared with the desired path lengths starting from the correct vehicle position or vehicle position determined in another manner. A GNSS path length measurement error or error profile is determined in this manner and is dependent on the current satellite position, the position of the GNSS receiving antenna on the vehicle and the environment (for example buildings). Since the relevant environment is generally static, the satellite and antenna positions (or vehicle position) remain dependent on the GNSS path length error profile. In order to also cope with changes in a quasi-static environment, old measurement data before a particular time are intended to be rejected if it is found that a data profile with a significant deviation (for example an average value over 100 measurements deviates by more than 30%) from the old data profile can be identified after this time. Furthermore, old measured values can be included with less weight than new measured values in the ascertainment of the data profile (for example weight is inversely proportional to the age of the measurement data in days).

Figure 2:
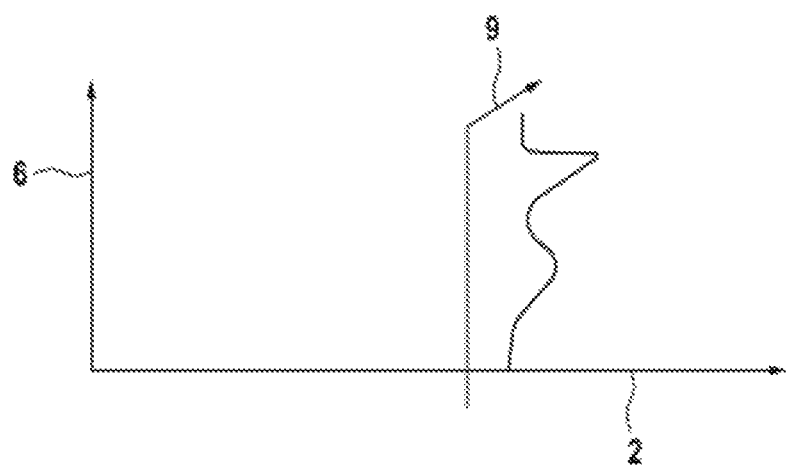
FIG. 2: schematically shows an exemplary graphical relationship between the frequency of a path length error at a particular vehicle position.

FIG. 2 schematically shows an exemplary graphical relationship between the frequency 9 of a path length error 6 at a particular vehicle position 2. Corresponding distribution statistics of the path length error 6 can be advantageously used for the GNSS position determination (for each satellite) during triangulation. This can contribute to the most likely position being able to be determined or selected taking into account the error statistics. Corresponding error statistics can be taken into account both for the pseudo-ranges and for data from inertial measuring units (IMU) if present. This can also contribute to reducing positioning ambiguities. In addition, the error ellipse of the IMU and/or dead reckoning can also be taken into account during trilateration or triangulation.

If GNSS position determination is intended to be carried out using the data profile described to here, the GNSS position of a GNSS receiver can be ascertained on the basis of the path length error beyond the usual dependences on the actual path length (pseudo-range), the ephemeris data and the state or observation space representation. For this purpose, the path length error can be taken from the data profile, for example, on the basis of the ephemeris data, the vehicle position and an antenna height. In this case, the ephemeris data represent the satellite position 3 (in the sense of the method presented here). In this case, the vehicle position in conjunction with the antenna height represents the vehicle position 2 (in the sense of the method presented here) or the receiver position which can be alternatively used. For this purpose, the current vehicle position can be determined or estimated on the basis of a known last vehicle position, for example by means of inertial navigation or an IMU.

Figure 3:
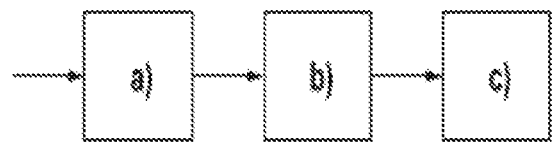
FIG. 3: schematically shows a flowchart of the method described.

The method is briefly illustrated again on the basis of FIG. 3. FIG. 3 illustrates method steps a), b) and c) which are to be carried out and are carried out in succession as a sequence.

The method contributes, in particular, to increasing the accuracy during satellite-based position determination (localization) in autonomous vehicles, in particular if the latter operate in urban areas, for example in street canyons. A particular advantage of the solution described here is that it can make it possible to correct environment-specific path length errors even without using a 3-D building map.

What is claimed is:

1. A method for determining an environment-specific data profile for a satellite-based determination of a position of a vehicle, comprising:
   receiving, with a Global Navigation Satellite System (GNSS) receiver within a first location, satellite data transmitted from a satellite using a transmitted signal;

determining a path length of the satellite signal between the satellite and the GNSS receiver using the satellite data;

determining an environment-specific data profile for the first location using a satellite position of the satellite, and the determined path length;

determining that the vehicle is within the first location; and determining the position of the vehicle using the environment-specific data profile.

2. The method according to claim 1, wherein the vehicle is determined to be within the first location using a vehicle environment sensor system and/or inertial navigation.

3. The method according to claim 1, wherein the environment-specific data profile includes a path length error profile for the first location.

4. The method according to claim 1, further comprising: determining a desired path length using the first location and the satellite position.

5. The method according to claim 4, further comprising: comparing the desired path length with an actual path length determined from the satellite data; and determining a path length error using the comparison.

6. The method according to claim 1, wherein the environment-specific data profile includes a path length profile.

7. The method according to claim 1, wherein a superordinate system manages the environment-specific data profile and the environment-specific data profile is accessible to a multiplicity of GNSS sensors.

8. The method according to claim 1, wherein:
the satellite signal is a first satellite signal of a plurality of satellite signals, the plurality of satellite signals transmitted over a period preceding the determination of the environment-specific data profile, each of the plurality of satellite signals associated with a respective one of a plurality of estimated vehicle locations; and
the environment-specific data profile is determined using the plurality of estimated vehicle locations and/or the plurality of satellite signals.

9. The method according to claim 8, further comprising: determining that an environment-specific data profile, with a significant deviation from an environment-specific data profile determined at a preceding time, can be determined by rejecting older ones of the plurality of estimated vehicle locations and/or plurality of satellite signals; and rejecting the older ones of the plurality of estimated vehicle locations and/or plurality of satellite signals, prior to determining the environment-specific data profile.

10. The method according to claim 1, wherein the method is carried out using a non-transitory computer program.

11. The method according to claim 10, wherein the non-transitory computer program is stored in a machine-readable storage medium.

12. The method of claim 1, wherein the GNSS receiver is mounted on a further vehicle.

13. The method of claim 12, wherein:
a further GNSS receiver is mounted on the vehicle; and
determining the position of the vehicle includes determining the position of the vehicle using the environment-specific data profile and further satellite data received with the further GNSS receiver.

14. The method of claim 1, further comprising: controlling the vehicle based upon the determined position.

15. A method for determining an environment-specific data profile for a satellite-based determination of a position of a vehicle, comprising:
estimating a first position of the vehicle;
receiving, with a Global Navigation Satellite System (GNSS) receiver, satellite data transmitted from a satellite using a transmitted signal;
determining an environment-specific data profile using the estimated position of the vehicle, a satellite position of the satellite from the received satellite data, and a path length of a satellite signal between the satellite position and the estimated vehicle position, as determined from the satellite data;
determining the environment-specific data profile using the estimated position of the vehicle and/or received satellite data, which were estimated and determined over a period preceding a determination time; and
rejecting older data of the estimated position of the vehicle and/or received satellite data, which were estimated and/or determined before a particular time, when the determined data profile with a significant deviation from a data profile determined at a preceding time can be determined after the particular time.

* * * * *